United States Patent [19]

Hayashi et al.

[11] Patent Number: 5,416,534
[45] Date of Patent: May 16, 1995

[54] MONITOR APPARATUS INCLUDING VIDEO PROCESSING CIRCUIT FOR SELECTING IMAGE QUALITY MODES

[75] Inventors: Toshihide Hayashi; Keiji Shirato, both of Kanagawa, Japan

[73] Assignee: Sony Corporation, Tokyo, Japan

[21] Appl. No.: 195,433

[22] Filed: Feb. 8, 1994

[30] Foreign Application Priority Data

Feb. 12, 1993 [JP] Japan ................................. 5-046148

[51] Int. Cl.$^6$ ............................................. H04N 5/57
[52] U.S. Cl. ..................................... 348/687; 348/678; 348/706; 348/728
[58] Field of Search ............... 348/687, 649, 678, 706, 348/722, 725, 728, 734, 731; 358/168, 28, 174, 181, 188, 191.1; H04N 9/64, 5/52, 5/57, 5/222, 5/268, 5/44, 5/455, 5/50

[56] References Cited

U.S. PATENT DOCUMENTS

| | | | |
|---|---|---|---|
| 4,549,217 | 10/1985 | Sendelweck | 348/678 |
| 4,706,108 | 11/1987 | Kumagai | 348/649 |
| 5,103,314 | 4/1992 | Keenan | 348/734 |
| 5,115,316 | 5/1992 | Gurley | 348/725 |
| 5,212,553 | 5/1993 | Maruoka | 348/725 |
| 5,257,106 | 10/1993 | Maruoka | 348/706 |

*Primary Examiner*—James J. Groody
*Assistant Examiner*—Sherrie Hsia
*Attorney, Agent, or Firm*—Peter C. Toto; Jerry A. Miller

[57] ABSTRACT

In a monitor apparatus for a television system, a dynamic range of a brightness level of an image quality is widened, and an image very similar to a picture of a movie film is represented on the monitor apparatus. With employment of the YM function for performing the half blanking process by controlling the gain of the video processor, for instance, when an image quality mode such as "theater" mode is selected, the video processor outputs such a control signal that the overall picture period becomes an H level (namely, YM function is turned ON). In the video processor into which such a control signal is inputted, the gain control is carried out. The video signal outputted from the video processor owns such a waveform that the half blanking process has been executed over the entire picture period. The brightness of the overall image can be lowered by this YM function.

14 Claims, 3 Drawing Sheets

MONITOR APPARATUS INCLUDING VIDEO PROCESSING CIRCUIT FOR SELECTING IMAGE QUALITY MODES

BACKGROUND OF THE INVENTION

1. Field of the Invention

The present invention generally relates to a monitor apparatus of a television system. More specifically, the present invention is directed to a monitor apparatus and a video signal processing circuit capable of selecting image quality modes corresponding to brightness of a room where the monitor apparatus is installed, and also to picture sources.

2. Description of the Related Art

Recently, various image medium with high image qualities such as satellite broadcasting and laser disks have been widely utilized. To monitor such high-quality images under better conditions, for instance, balances in brightness of image, a hue or tint thereof, and a shade of color are adjusted in correspondence with install conditions (e.g., brightness of a room) for the monitor apparatus, and wishes of a user, so that the images can be represented under better conditions.

There are some types of monitor apparatuses capable of selectively setting the image quality modes prepared in the image processor by adjusting such brightness and color tint. These monitor apparatuses are equipped with such image quality modes as "standard", "living" and "theater" in order to accept the setting conditions of the monitor apparatuses and wishes of the user.

The "theater" mode corresponds to a mode that is selected when the movies are monitored. In this "theater" mode, such image processing is carried out that the image qualities of the projected image are approximated to those of the movie film. When the "theater" mode is selected, brightness, or luminance of images is controlled to be low by way of such functions as "bright" and "picture", so that images darker and lighter than the normal images, with shape colors and sharp contour can be obtained. Furthermore, in case that such images are observed, users may enjoy pictures such as movie pictures with having feelings that they are actually in a movie theater by darkening illumination of the monitoring room.

When the movie or the like is monitored in the "theater" mode, the user can have the feeling of being at a live performance, e.g., at the movie theater by darkening illumination of the monitoring room. The conventionally utilized functions such as "bright" and "picture" do not own sufficient dynamic ranges of control levels, and therefore have limitations in lowering brightness of images. As a consequence, even when the "theater" mode is selected, if illumination of the monitoring room would be darkened, brightness of the monitored images would be conversely emphasized. Therefore, there is a problem that the above-described image qualities such as the movie film would be lost.

SUMMARY OF THE INVENTION

The present invention has been made in an attempt to solve the above-described problem, and has an object to provide a monitor apparatus comprising:

a switch circuit for selectively outputting plural sorts of video signals;

a video processor for converting the video signal outputted from the switch circuit into a predetermined color signal;

a monitor for displaying said predetermined color signal;

a memory circuit for storing a parameter used to control an image quality of the monitor;

a gain control circuit for controlling a gain of brightness of the video signal; and a control circuit for selecting the parameter of the memory circuit based upon the video signal selectively outputted from the switch circuit, to control a gain amount of the gain control circuit.

In the monitor apparatus having the YM function, an image with a better image quality and low brightness may be obtained without newly employing a circuit.

As previously explained, according to one aspect of the present invention, there are the following features in the monitor apparatus capable of setting various sorts of image quality modes. That is, since half blanking by the YM function is performed over the entire image to lower the brightness level of the image, both the "theater" mode selected when a movie film is monitored, and the half blanking by the YM function are performed, so that the dynamic range of brightness can be widened, and the image quality pattern can be widened, and also there is a clear difference between a bright image portion and a dark image portion. Moreover, even when an image displayed on the monitor apparatus is monitored while a user darkens illumination of a monitoring room, brightness of the displayed image would not be emphasized but the image quality of the displayed image may be resembled to that of the movie film. As a result, the image displayed on the monitor apparatus according to the present invention could give a user the feeling of being at a live performance, e.g., at a theater. Also, since the present invention may be realized by utilizing the conventional YM function, there are advantages that no additional function circuit is required in the monitor apparatus of the present invention, and low manufacturing cost may be maintained.

DETAILED DESCRIPTION OF PREFERRED EMBODIMENTS

Figure 1:
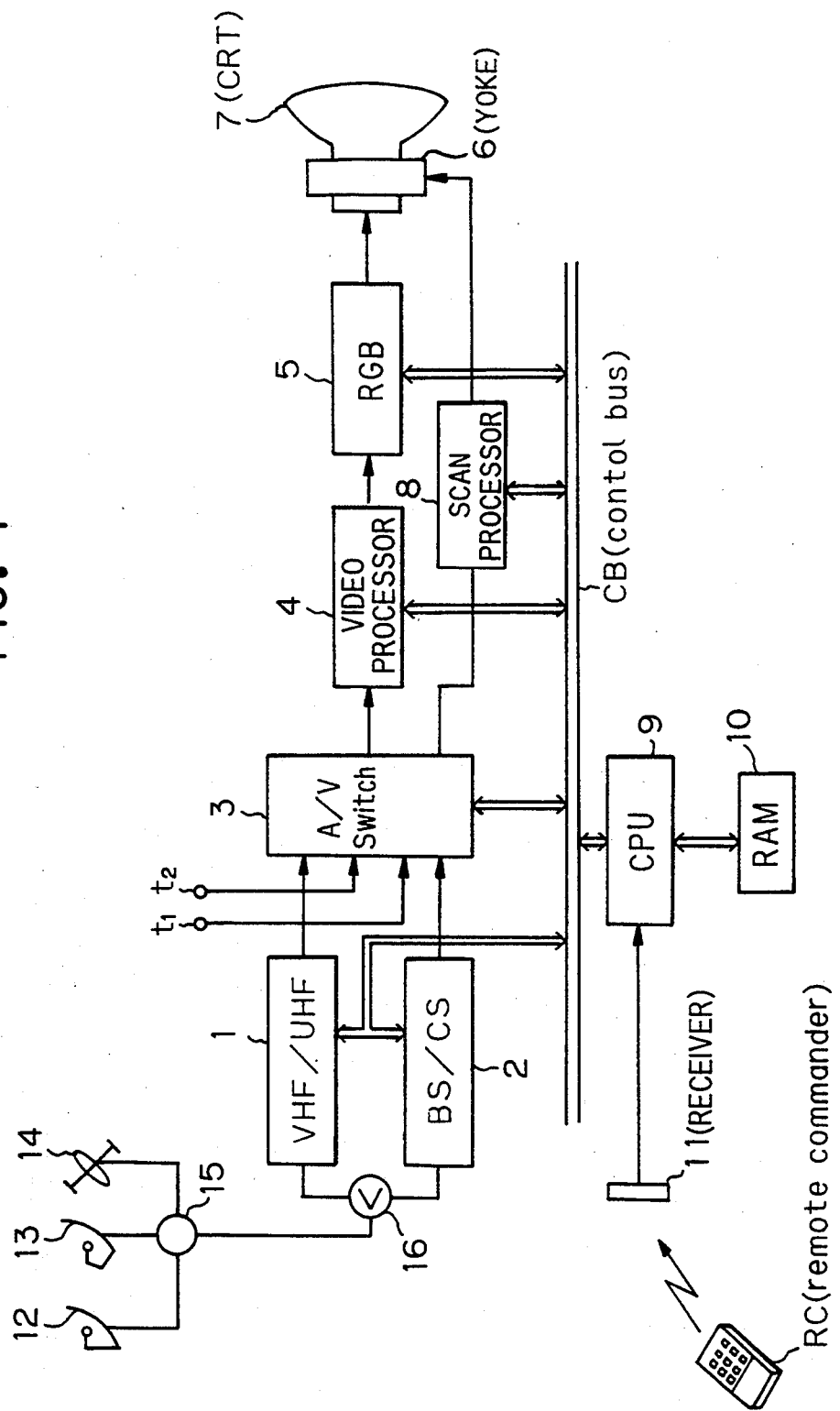
FIG. 1 is a schematic block diagram for showing a video signal circuit of a television receiver according to an embodiment of the present invention.

A description will now be made of an example in which a monitor apparatus according to the present invention is employed in a television receiver. FIG. 1 is a schematic circuit block diagram of a television receiver according to an embodiment of the present invention, especially, video signal circuitry thereof. In the circuit of FIG. 1, reference numeral 1 indicates a UHF/VHF tuner for selecting ground-based broadcasting channels which are received by a U/V antenna 14, and supplied via a mixer 15 and a distributor 16 to this tuner 1. Reference numeral 2 represents a BS/CS tuner for selecting satellite broadcasting channels which are received by a BS antenna 12 and a CS antenna 13, and supplied via the mixer 15 and the distributor 16 to this tuner 2.

Reference numeral 3 shows an AV switch for extracting a video signal, an audio signal, and a synchronization (sync) signal from the signals selected from the UHF/VHF tuner 1 and the BS/CS tuner 2, and further for selecting the respective signals and a video signal, an audio signal, and a synchronization (sync) signal, which are inputted into external input terminals t1 and t2.

Reference numeral 4 indicates a video processor for performing a video signal processing operation. The processed video signal is supplied to an RGB drive circuit 5 and then displayed on a CRT (cathode-ray tube 7). This video processor 4 has the YM (half blanking) function (will be discussed later). Reference numeral 8 represents a scan processor for receiving the sync signal of the video source outputted from the AV switch 3, and for furnishing horizontal/vertical deflection currents to a deflection yoke 6 at timing of this sync signal.

Further, reference numeral 9 denotes a CPU (central processing unit) for executing controls of the above-described respective functions via a control bus CB in response to either an operation, or a control command, which is outputted from a remote commander RC and entered via an infrared radiation receiving unit 11. Reference numeral 10 shows a memory (for instance RAM) for finally storing various sorts of image-quality parameters such as color tint and brightness, various sorts of control data, and conditions of the various functional circuits.

The above-described YM (half blanking) function of the video processor 4 implies the following function. That is, in response to the control signal entered from the CPU 9 via the control bus CB, the video processor 4 controls the level of the signal inputted from the AV switch 3 so as to lower the brightness level of such a specific display area on the CRT 7, where character/figure information is represented.

Figure 2A:
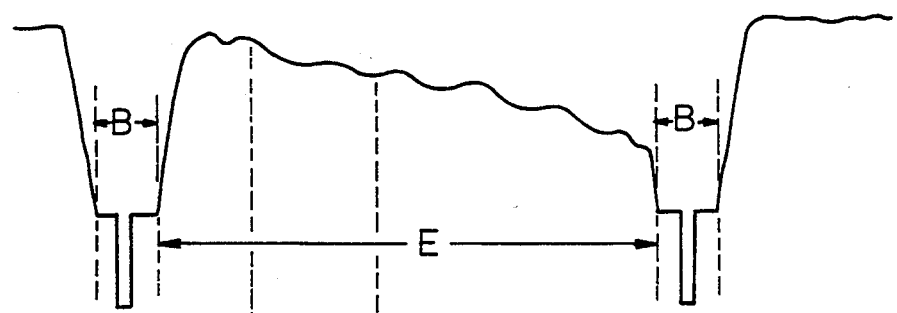
FIG. 2(A) is a waveform chart for representing a control signal of the YM function and a video signal to which a half blanking process has been performed.
Figure 2B:
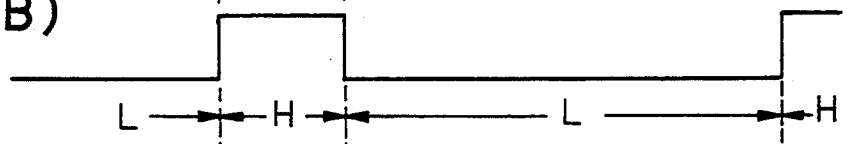
FIG. 2(B) is a waveform chart for representing a control signal of the YM function and a video signal to which a half blanking process has been performed.
Figure 2C:
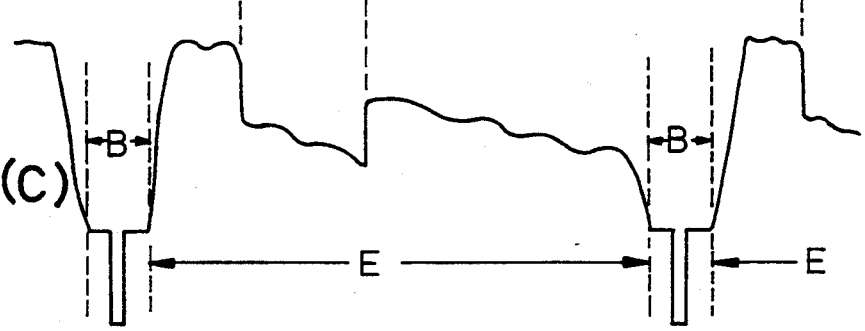
FIG. 2(C) is a waveform chart for representing a control signal of the YM function and a video signal to which a half blanking process has been performed.
Figure 2D:
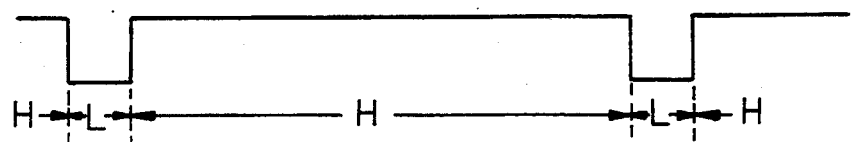
FIG. 2(D) is a waveform chart for representing a control signal of the YM function and a video signal to which a half blanking process has been performed.
Figure 2E:
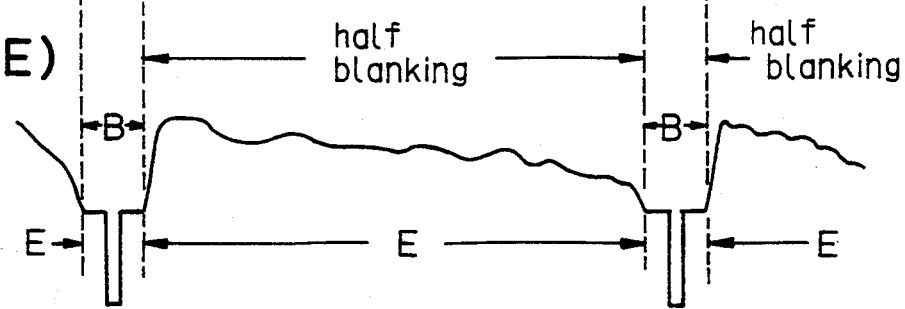
FIG. 2(E) is a waveform chart for representing a control signal of the YM function and a video signal to which a half blanking process has been performed.

FIGS. 2(A)–2(E) represent waveforms of the video (picture) signal and the control signal when the half blanking control is performed. FIG. 2(A) shows a waveform of the normal video signal, and FIGS. 2(B) and 2(D) indicate waveforms of the control signals derived from the CPU 9, where the YM function is turned ON only during a time period of the H level. FIGS. 2(C) and 2(E) represent waveforms of the video signal which have been processed by the half blanking process and are outputted from the video processor 4. In FIGS. 2(A) to FIG. 2(E), symbol "B" denotes a blanking period, symbol "E" represents a picture period, symbol "L" shows a level of the control signal at which the YM function is turned OFF, and symbol "H" indicates a level of the control signal at which the YM function is turned ON.

With respect to the video signal shown in FIG. 2(A), in case that the half blanking process is performed in order to display a menu by way of characters, for instance, as shown in FIG. 2(B), such a control signal whose signal level becomes "H" at the display position of the characters, is outputted from the CPU 9. Then, the YM function is turned ON only at this display position, so that the blanking control is performed.

Since a control to lower the gain of the video processor 4 is carried out during such a period where this YM function is turned ON, as represented in FIG. 2(C), the video signal outputted from the video processor 4 has such a waveform to which the half blanking process has been performed during the time period of the H level.

In accordance with the present invention, the above-explained YM function is commonly performed in conjunction with the conventionally employed image quality mode, i.e., the "theater" mode, so that such a picture representation suitable to monitor a movie film can be realized.

For instance, when the "theater" mode is selected, as shown in FIG. 2(D), the control signal for YM function whose signal level becomes "H" during the entire picture period E, is outputted from the CPU 9. Then, the video processor 4 into which the above-explained control signal is inputted, performs a control to, for instance, reduce the gain. The video signal outputted from the video processor 4 owns such a waveform that the half blanking process is performed for the entire picture period "E", as shown in FIG. 2(E).

Figure 3:
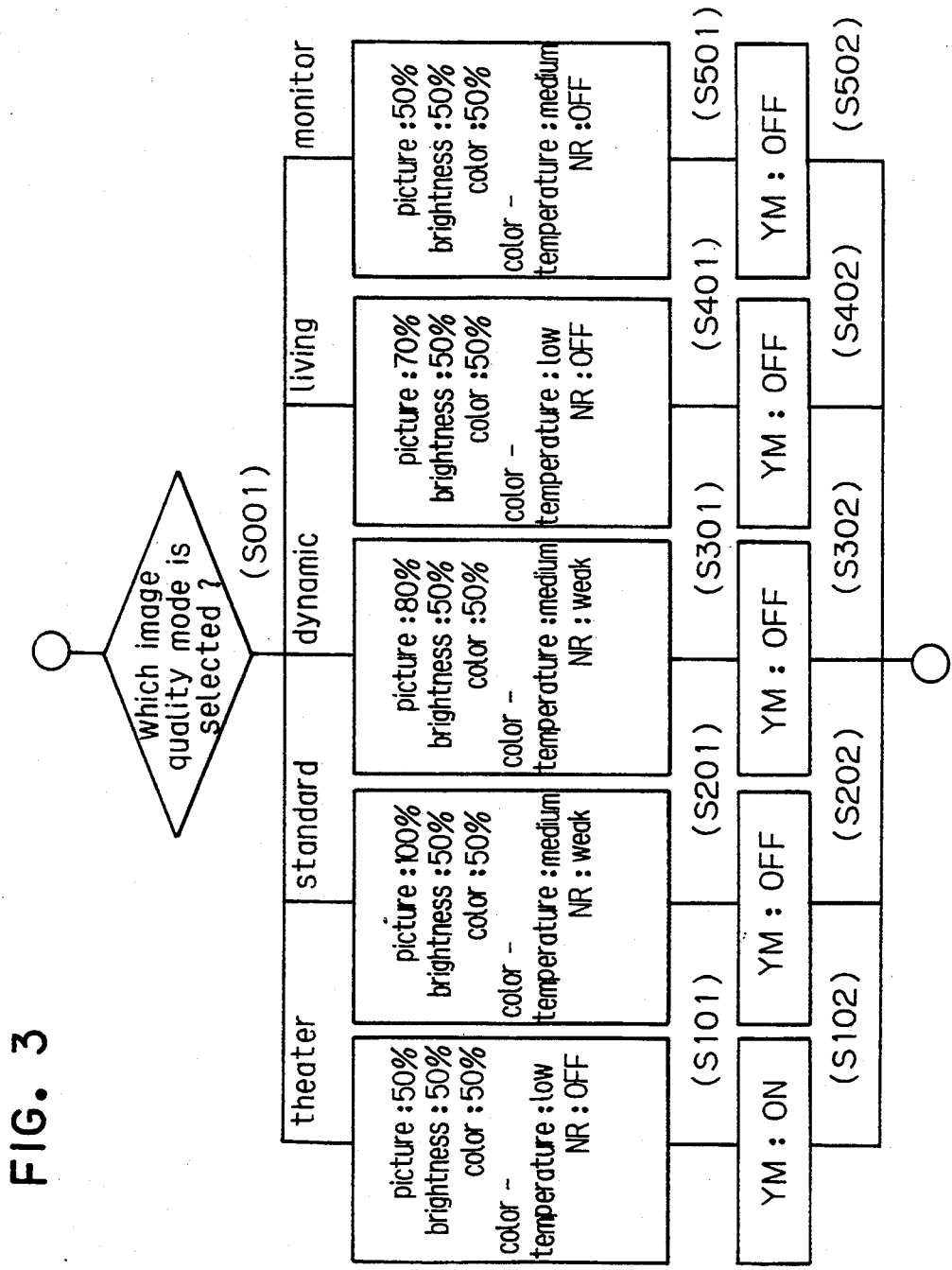
FIG. 3 is a flow chart for explaining operations when the image quality modes are selected.

FIG. 3 is a flow chart for representing one example of various parameters which are selected when the user selects the image quality modes. The user performs a selection of the image quality mode (step S001). For example when the "theater" mode is selected by the user, the various image quality data such as "picture:50%", "brightness:50%", "color temperature low", "NR (noise reducer):OFF", which have been previously stored in the memory 10, are read out and then set into the video processor 4 (step S101).

The "picture" has a function to offset the gain of brightness and the reference level of brightness to a predetermined amount.

The "bright" has a function to offset the reference level of brightness to a predetermined amount.

The "color" has a function to control color brightness.

The "color temperature" control has a function to control an angle of the reference color.

When other image quality modes such as "standard", "dynamic", "living", and "monitor" are selected, the image quality data corresponding to the selected image quality mode are similarly read out from the memory 10 and then are set to the video processor 4 in accordance with process operations as defined at steps S201, S301, S401 and S501.

As described above, when the respective image quality modes are selected, the image quality parameters corresponding to the selected image quality mode. When the "theater" mode is selected, the YM function is turned ON at the same time when the image quality parameters are set (step S102), and the control signal as previously explained in connection with FIG. 2(D) is outputted from the CPU 9. Then, the half blanking process is performed to the overall picture, so that brightness of the displayed image in this "theater" mode can be lowered, as compared with that of the conventional "theater" mode.

Even when other image quality modes such as "standard", "dynamic", "living", and "monitor" other than the "theater" mode are selected, the YM function may be additionally employed, if required (steps S202, S302, S402, S502). As a result, there could be furthermore provided variations in the image patterns.

It should be noted that although the YM function changing operation (explained in the step S102) is automatically performed at the same time when the "theater" mode is selected in the above-explained embodiment, this YM function may be arbitrarily turned ON in accordance with the manual operation by the user.

What is claimed is:

1. A monitor apparatus comprising:
   a switch circuit for selectively outputting at least a video signal;
   a video processor for converting the video signal outputted from the switch circuit into a predetermined color signal;
   a monitor for displaying said predetermined color signal;
   a memory circuit for storing a parameter used to control an image quality of the monitor;
   a gain control circuit for controlling a gain of brightness of the video signal, said gain control circuit including a brightness controller for reducing a brightness level of the video signal by a predetermined ratio; and
   a control circuit for selecting the parameter of the memory circuit based upon a user selected image quality mode, thereby controlling a gain amount of the gain control circuit.

2. A monitor apparatus according to claim 1, wherein the brightness level is reduced by approximately ½ by said brightness controller.

3. A monitor apparatus according to claim 2, wherein brightness level reduction by the brightness controller is set by way of a manual operation by the user.

4. A monitor apparatus according to claim 3, wherein said brightness level reduction by the brightness controller is set by way of the manual operation by the user with employment of a remote commander.

5. A monitor apparatus according to claim 4, wherein said parameter stored in the memory circuit contains at least information about brightness and color.

6. A monitor apparatus according to claim 5, wherein said parameter stored in the memory circuit further contains information about noise reduction.

7. A monitor apparatus according to claim 6, wherein said user selected image quality mode can include at least a standard mode and a theater mode, and said parameter stored in the memory circuit corresponds to one of said standard and theater modes.

8. A video signal processing circuit in a monitor apparatus, comprising:
   a switch circuit for selectively outputting at least a video signal;
   a video processor for converting the video signal outputted from the switch circuit into a predetermined color signal, and for outputting said converted color signal to a monitor;
   a memory circuit for storing a parameter used to control an image quality of the monitor;
   a gain control circuit for controlling a gain of brightness of the video signal, said gain control circuit including a brightness controller for reducing a brightness level of the video signal by a predetermined ratio; and
   a control circuit for selecting the parameter of the memory circuit based upon a user selected image quality mode, thereby controlling a gain amount of the gain control circuit.

9. A video signal processing circuit in a monitor apparatus according to claim 8, wherein the brightness level is reduced by approximately ½ by said brightness controller.

10. A video signal processing circuit in a monitor apparatus according to claim 9, wherein brightness level reduction by the brightness controller is set by way of a manual operation by the user.

11. A video signal processing circuit in a monitor apparatus according to claim 10, wherein said brightness level reduction by the brightness controller is set by way of the manual operation by the user with employment of a remote commander.

12. A video signal processing circuit in a monitor apparatus according to claim 11, wherein said parameter stored in the memory circuit contains at least information about brightness and color.

13. A video signal processing circuit in a monitor apparatus according to claim 12, wherein said parameter stored in the memory circuit further contains information about noise reduction.

14. A video signal processing circuit in a monitor apparatus according to claim 13, wherein said user selected image quality mode can include at least a standard mode and a theater mode, and said parameter stored in the memory circuit corresponds to one of said standard and theater modes.

* * * * *